United States Patent
Wilson et al.

(10) Patent No.: US 9,477,255 B2
(45) Date of Patent: Oct. 25, 2016

(54) SYSTEMS AND METHODS FOR SUSPENDING IDLE DEVICES BASED ON IDLE POLICIES FOR THE DEVICES

(75) Inventors: Daniel B. Wilson, San Francisco, CA (US); Anand Dalal, San Jose, CA (US)

(73) Assignee: APPLE INC., Cupertino, CA (US)

( * ) Notice: Subject to any disclaimer, the term of this patent is extended or adjusted under 35 U.S.C. 154(b) by 840 days.

(21) Appl. No.: 13/544,584

(22) Filed: Jul. 9, 2012

(65) Prior Publication Data

US 2014/0013137 A1 Jan. 9, 2014

(51) Int. Cl.
*G06F 1/00* (2006.01)
*G06F 1/32* (2006.01)

(52) U.S. Cl.
CPC . *G06F 1/00* (2013.01); *G06F 1/32* (2013.01); *G06F 1/3215* (2013.01)

(58) Field of Classification Search
CPC .. G06F 1/00; G06F 11/0745; G06F 11/0757; G06F 13/00; G06F 13/385; G06F 1/32; G06F 1/3215
See application file for complete search history.

(56) References Cited

U.S. PATENT DOCUMENTS

| | | | |
|---|---|---|---|
| 6,085,325 A * | 7/2000 | Jackson et al. | 713/300 |
| 6,816,976 B2 | 11/2004 | Wright et al. | |
| 7,194,638 B1 | 3/2007 | Larky | |
| 7,340,550 B2 | 3/2008 | Durr et al. | |
| 7,577,765 B2 | 8/2009 | Bhesania et al. | |
| 7,698,490 B2 * | 4/2010 | Terrell, II | G06F 13/4295 320/155 |
| 8,255,708 B1 * | 8/2012 | Zhang | 713/300 |
| 2002/0129159 A1 * | 9/2002 | Luby et al. | 709/236 |
| 2004/0243737 A1 * | 12/2004 | Beardsley | G06F 13/385 710/22 |
| 2007/0081547 A1 * | 4/2007 | Munje | H04W 76/046 370/437 |
| 2007/0147330 A1 * | 6/2007 | Smith et al. | 370/346 |
| 2008/0228291 A1 * | 9/2008 | Hubo et al. | 700/40 |
| 2009/0077277 A1 * | 3/2009 | Vidal | G06F 1/3203 710/46 |
| 2009/0113114 A1 * | 4/2009 | Berenbaum et al. | 711/103 |
| 2009/0199031 A1 * | 8/2009 | Zhang | G06F 1/3203 713/323 |
| 2010/0167792 A1 * | 7/2010 | Chen | G06F 1/3203 455/566 |
| 2010/0306788 A1 * | 12/2010 | Lee et al. | 719/321 |
| 2011/0138203 A1 | 6/2011 | Chang et al. | |
| 2012/0246505 A1 * | 9/2012 | Ma | G06F 1/00 713/324 |

* cited by examiner

*Primary Examiner* — Thomas Lee
*Assistant Examiner* — Zhipeng Wang
(74) *Attorney, Agent, or Firm* — Fletcher Yoder PC (57) ABSTRACT

A method for suspending an idle device includes receiving, by a processor, an indication that a device having a communication channel is connected to a host device. The method then includes determining a first timeout value associated with the communication channel and a second timeout value associated with the first device. The first timeout value corresponds to an amount of time allotted for an operation to complete in the communication channel, and the second timeout value corresponds to an amount of time allotted for the device to be designated as idle before the device is suspended. The device is determined to be idle when the operation is pending in the communication channel for an amount of time that is greater than the first timeout value. The device is suspended when the device has been idle for an amount of time that is greater than the second timeout value.

20 Claims, 7 Drawing Sheets

SYSTEMS AND METHODS FOR SUSPENDING IDLE DEVICES BASED ON IDLE POLICIES FOR THE DEVICES

BACKGROUND

The present disclosure relates generally to methods for suspending devices that may be connected to a host electronic device, and more specifically, to suspending connected devices, which are determined to be idle, to achieve greater power savings.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices generally employ power management strategies to ensure that the devices use power efficiently. As more portable electronic devices become available, more focus is placed on ways to aggressively save power such that the batteries used to power these devices may be used longer. Some power management strategies involve suspending a device connected to a host electronic device, thereby placing the device in a low-power state. Although these power management strategies may enable an electronic device to save power, these power management strategies may only suspend the device using a manual process. That is, the electronic device may not suspend the connected device unless a user manually forces it to go into a low power state. As a result, the electronic device may not efficiently use its power if a user does not suspend the connected device at appropriate times.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to automatically suspending an I/O device coupled to a host processor after determining that the connected I/O device has become idle. In one embodiment, an application processor (i.e., host processor) may have access to drivers that store information used for determining whether a device connected to the host processor has become idle. The information stored in the drivers may specify an individual idle policy for each type of device or each communication channel in the device that may be connected to the application processor. Each individual idle policy may include a timeout value for pending input/output (I/O) operations, which may be used to determine whether pending I/O operations are idle, and a device timeout value, which may be used to determine whether the connected I/O device has become idle.

Once a device is connected to the application processor, a driver associated with the connected I/O device may initialize an idle policy for the corresponding device. The idle policy may specify an I/O timeout value for each I/O operation that may be performed in the device. If the device does not have any activity on any of its communication channels for an amount of time that exceeds the corresponding I/O timeout value, the application processor may determine that the corresponding I/O device may be idle. As mentioned above, in addition to specifying the I/O timeout value for each I/O operation, the idle policy may also specify a device timeout value or the connected I/O device. The device timeout value may indicate an amount of time between when all of the pending I/O operations have passed their respective I/O timeout values or when no I/O operations are pending and when the connected I/O device may be suspended. In other words, if no I/O operations are pending or if all pending I/O operations have exceeded their respective I/O timeout values, the application processor may automatically suspend the connected I/O device after the device timeout has expired. As such, the application processor may enable the host electronic device to be more efficient by preventing idle devices from being powered while idle.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to systems and methods for enabling a host processor to automatically suspend an idle input/output (I/O) device that may be connected to the host processor. As used herein, an "I/O device" may be any device that is internally or externally connected to the host processor. In one embodiment, an application processor (i.e., host processor) may access drivers that may specify idle policies for various types of I/O devices that may be coupled to the processor. The idle policy may indicate a timeout value for each input/output (I/O) channel in the various types of I/O devices and a timeout value for the various types of I/O devices. After the application processor determines the idle policy that corresponds to the connected I/O device, the application processor may determine whether any of the communication channels of the connected I/O device is being used for an operation (e.g., sending or receiving packets). If none of the communication channels are being used for an operation, the application processor may determine that the connected I/O device is idle. Alternatively, if any of the pending operations on any of the communication channels takes more time than its corresponding I/O timeout value, as specified by the idle policy, the application processor may determine that the connected I/O device is idle. Once the connected I/O device has been determined to be idle, the application processor may determine whether the connected I/O device has been idle for more than the device timeout value, as specified by the idle policy. After the connected I/O device has been idle for longer than the device timeout value, the application processor may place the connected I/O device into a low-power state, thereby preserving the power available to the application processor and the device the application processor is stored within.

Figure 1:
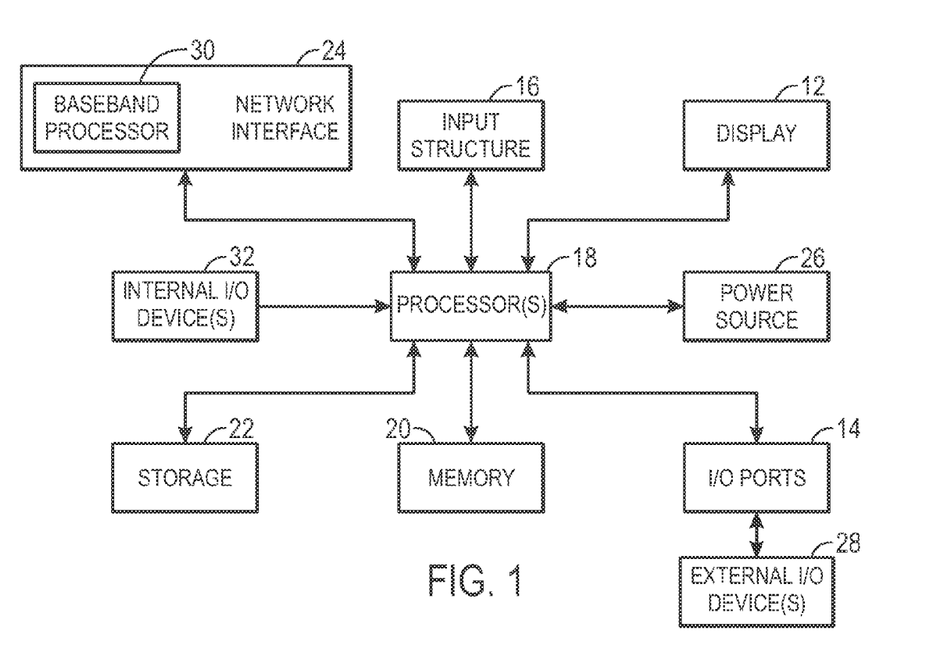
FIG. 1 is a block diagram of exemplary components of an electronic device, in accordance with an embodiment.

A variety of electronic devices may incorporate systems and methods for suspending connected I/O devices. An example of a suitable electronic device may include various internal and/or external components, which contribute to the function of the device. FIG. 1 is a block diagram illustrating the components that may be present in such an electronic device 10 and which may allow the electronic device 10 to function in accordance with the methods discussed herein. Those of ordinary skill in the art will appreciate that the various functional blocks shown in FIG. 1 may include hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in the electronic device 10. For example, in the presently illustrated embodiment, these components may include a display 12, I/O ports 14, input structures 16, one or more processors 18, a memory device 20, a non-volatile storage 22, a networking device 24, a power source 26, one or more external input/output (I/O) devices 28, a baseband processor 30, one or more internal input/output (I/O) devices 32, and the like.

With regard to each of these components, the display 12 may be used to display various images generated by the device 10. The I/O ports 14 may include ports configured to connect to a variety of external I/O devices 28, such as a power source, headset or headphones, peripheral devices such as keyboards or mice, or other electronic devices 10 (such as handheld devices and/or computers, printers, projectors, external displays, modems, docking stations, and so forth). In one embodiment, the external I/O devices 28 may be Universal Serial Bus (USB) devices that may be connected to the processor 18 via a USB bus.

The input structures 16 may include the various devices, circuitry, and pathways by which user input or feedback is provided to the processor 18. Such input structures 16 may be configured to control a function of the device 10, applications running on the device 10, and/or any interfaces or devices connected to or used by the electronic device 10.

The processor(s) 18 may provide the processing capability to execute the operating system, programs, user and application interfaces, and any other functions of the electronic device 10. The instructions or data to be processed by the processor(s) 18 may be stored in a computer-readable medium, such as a memory 20. Such a memory 20 may be provided as a volatile memory, such as random access memory (RAM), and/or as a non-volatile memory, such as read-only memory (ROM). The components may further include other forms of computer-readable media, such as a non-volatile storage 22, for persistent storage of data and/or instructions. The non-volatile storage 22 may include flash memory, a hard drive, or any other optical, magnetic, and/or solid-state storage media. The non-volatile storage 22 may be used to store firmware, data files, software, wireless connection information, and any other suitable data.

The network device 24 may include a network controller or a network interface card (NIC). Additionally, the network device 24 may be a Wi-Fi device, a radio frequency device, a Bluetooth® device, a cellular communication device, or the like. The network device 24 may allow the electronic device 10 to communicate over a network, such as a Local Area Network (LAN), Wide Area Network (WAN), or the Internet. The network interface 24 may also include various components, such as a baseband processor 30, which may manage each communication channel of the network interface 24.

The electronic device 10 may also include the internal I/O devices 32, which may include group of integrated circuits, or chips, that may be designed to work together to perform various functions on the electronic device 10. The internal I/O device 32 may be a High-Speed Inter-Chip (HSIC) device coupled to the processor 18 using a High-Speed Inter-Chip (HSIC) bus. In any case, the methods described herein may be applied to various components, such as the external I/O devices 28, the baseband processor 30, the internal I/O devices 32, and the like, to ensure that the electronic device 10 makes efficient use of its power from the power source 26.

The power source 26 may include a variety of power types such as a battery or AC power. For portable electronic devices, the power source 26 may typically be a battery. As such, to enhance the user's experience in operating the portable electronic device, it may be beneficial to minimize the power used by the portable electronic device and to preserve the maximum amount of energy in the power source 26 such that the portable electronic device may be operable for extended periods of time.

Keeping this in mind, the processor 18 may employ a method that automatically suspends a connected I/O device (e.g., external I/O devices 28, the baseband processor 30, the internal I/O devices 32) when it determines that the connected I/O device has become idle. By suspending the connected I/O device, the processor 18 may place the connected I/O device into a low-power mode to preserve the energy stored in the power source 26. Additional details with regard to suspending idle I/O devices will be discussed below with reference to FIGS. 4-7.

Figure 2:
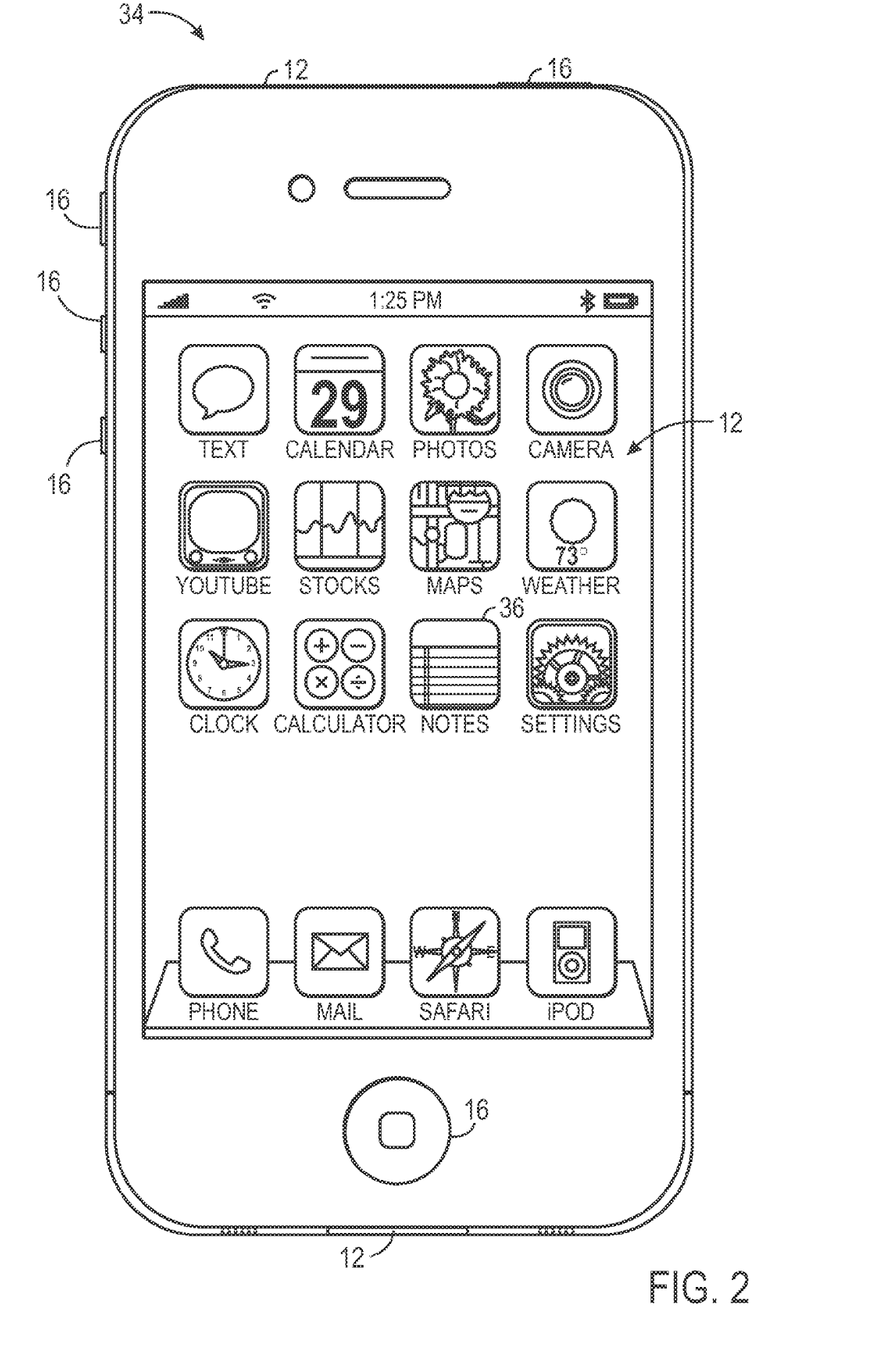
FIG. 2 is a front view of a handheld electronic device, in accordance with an embodiment.

With the foregoing in mind, FIG. 2 illustrates an electronic device 10 in the form of a handheld device 34, here a cellular telephone. It should be noted that while the depicted handheld device 34 is provided in the context of a cellular telephone, other types of handheld devices (such as media players for playing music and/or video, personal data organizers, handheld game platforms, and/or combinations of such devices) may also be suitably provided as the electronic device 10. As discussed with respect to the general electronic device 10 of FIG. 1, the handheld device 34 may allow a user to connect to and communicate through the Internet or through other networks, such as local or wide area networks. The handheld electronic device 34, may also communicate with other devices using short-range connections, such as Bluetooth and near field communication. By way of example, the handheld device 34 may be a model of an iPod®, iPad®, or iPhone® available from Apple Inc. of Cupertino, Calif.

The handheld device 34 includes an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 34 to facilitate wireless communication. In the depicted embodiment, the enclosure includes user input structures 16 through which a user may interface with the device. Each user input structure 16 may be configured to help control a device function when actuated.

In the depicted embodiment, the handheld device 34 includes a display 12. The display 12 may be used to display a graphical user interface (GUI) that allows a user to interact with the handheld device 34. The handheld electronic device 34 also may include various input and output (I/O) ports that allow connection of the handheld device 34 to external devices such as a port that allows the transmission and reception of data or commands between the handheld electronic device 34 and another electronic device, which may be suspended by the processor 18.

Figure 3:
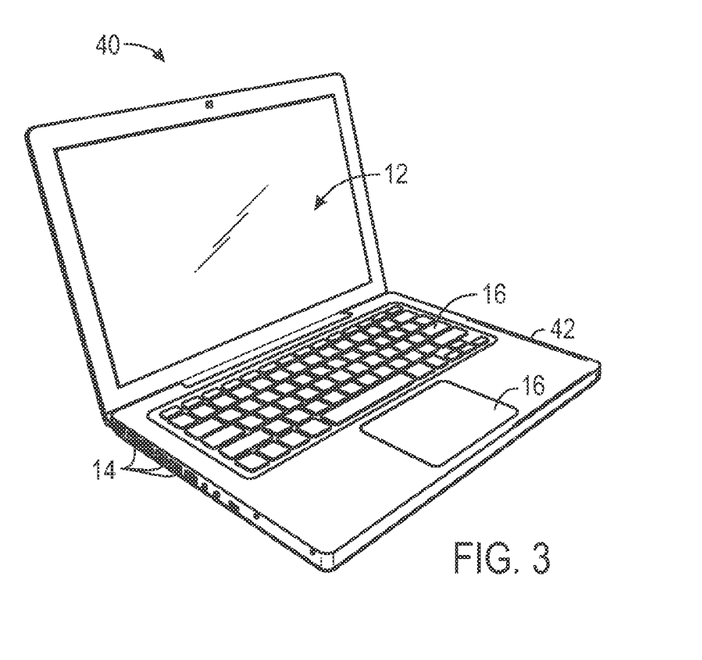
FIG. 3 is a view of a computer, in accordance with an embodiment.

In addition to handheld devices 34, such as the depicted cellular telephone of FIG. 2, an electronic device 10 may also take the form of a computer or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, iPad® or Mac Pro® available from Apple Inc. By way of example, an electronic device 10 in the form of a laptop computer 40 is illustrated in FIG. 3 in accordance with one embodiment. The depicted computer 40 includes a housing 42, a display 12, input structures 16, and input/output ports 14.

In one embodiment, the input structures 16 (such as a keyboard and/or touchpad) may be used to interact with the computer 40, such as to start, control, or operate a GUI or applications running on the computer 40. For example, a keyboard and/or touchpad may allow a user to navigate a user interface or application interface displayed on the display 12.

As depicted, the electronic device 10 in the form of computer 40 may also include various input and output ports 14 to allow connection of additional devices. For example, the computer 40 may include an I/O port 14, such as a USB port or other port, suitable for connecting to another electronic device, a projector, a supplemental display, and so forth. In one embodiment, the methods described herein may be used to automatically suspend the electronic devices connected to the I/O port 14. In addition, the computer 40 may include network connectivity, memory, and storage capabilities, as described with respect to FIG. 1. As a result, the computer 40 may store and execute a GUI and other applications.

Figure 4:
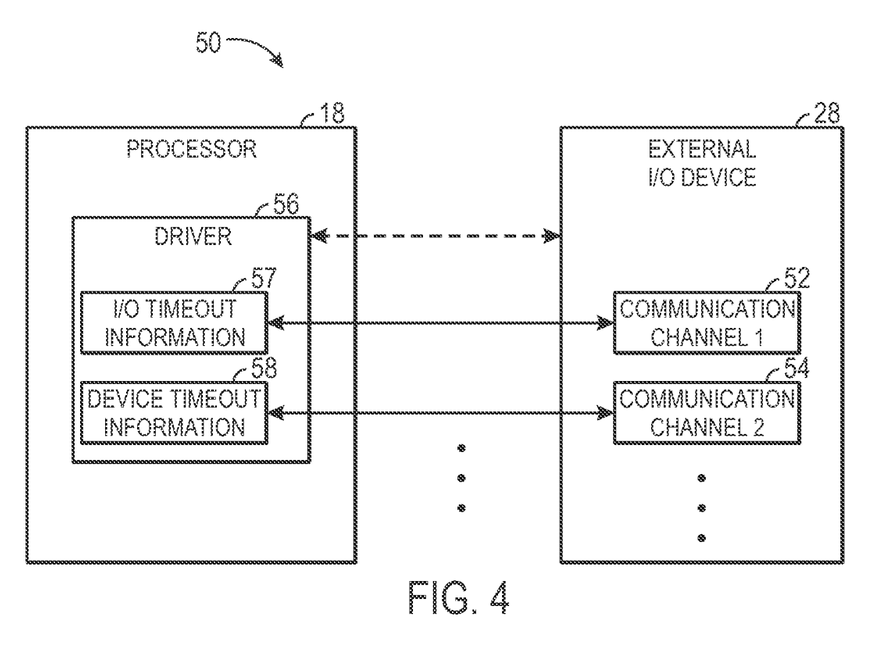
FIG. 4 is a block diagram of communication channels between an input/output device and a processor in the electronic device of FIG. 1, in accordance with an embodiment.

With the foregoing discussion in mind, FIG. 4 depicts a block diagram 50 of communication channels (52 and 54) of the external I/O device 28 of FIG. 1. The communication channels (52 and 54) may be coupled to the processor 18 and may be used by the processor 18 to perform various operations using the external I/O device 28. For example, the processor 18 may send various read or write operations to the external I/O device via the communication channels (52 and 54).

The external I/O device 28 may be associated with a driver 56, which may be accessed by the processor 18. The driver 56 may communicate with the external I/O device 28 and act as a translator between the external I/O device 28 and the processor 18 that may be using it. As such, the driver 56 may include information related to the particular external I/O device 28 that may be connected to the processor 18. In particular, the driver 56 may include information related to an I/O timeout value or a device timeout value, both of which is described in more detail with reference to FIG. 5 below. Although FIG. 4 depicts the external I/O device 28 as part of the block diagram 50, it should be noted that the block diagram 50 may also employ the internal I/O device 30 instead of the external I/O device 28.

Figure 5:
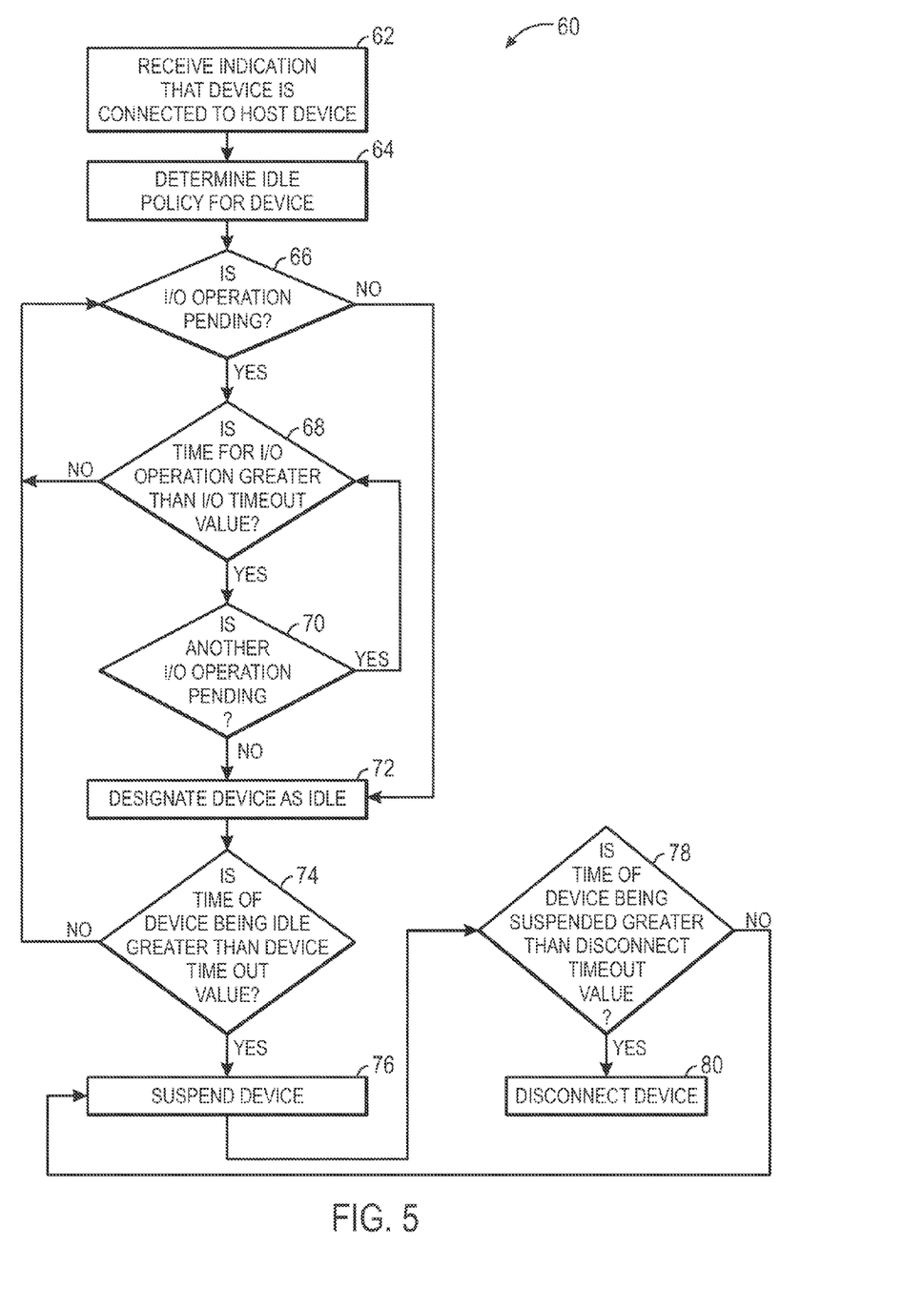
FIG. 5 is a flow chart that depicts a method for suspending an idle device, in accordance with an embodiment.
Figure 6:
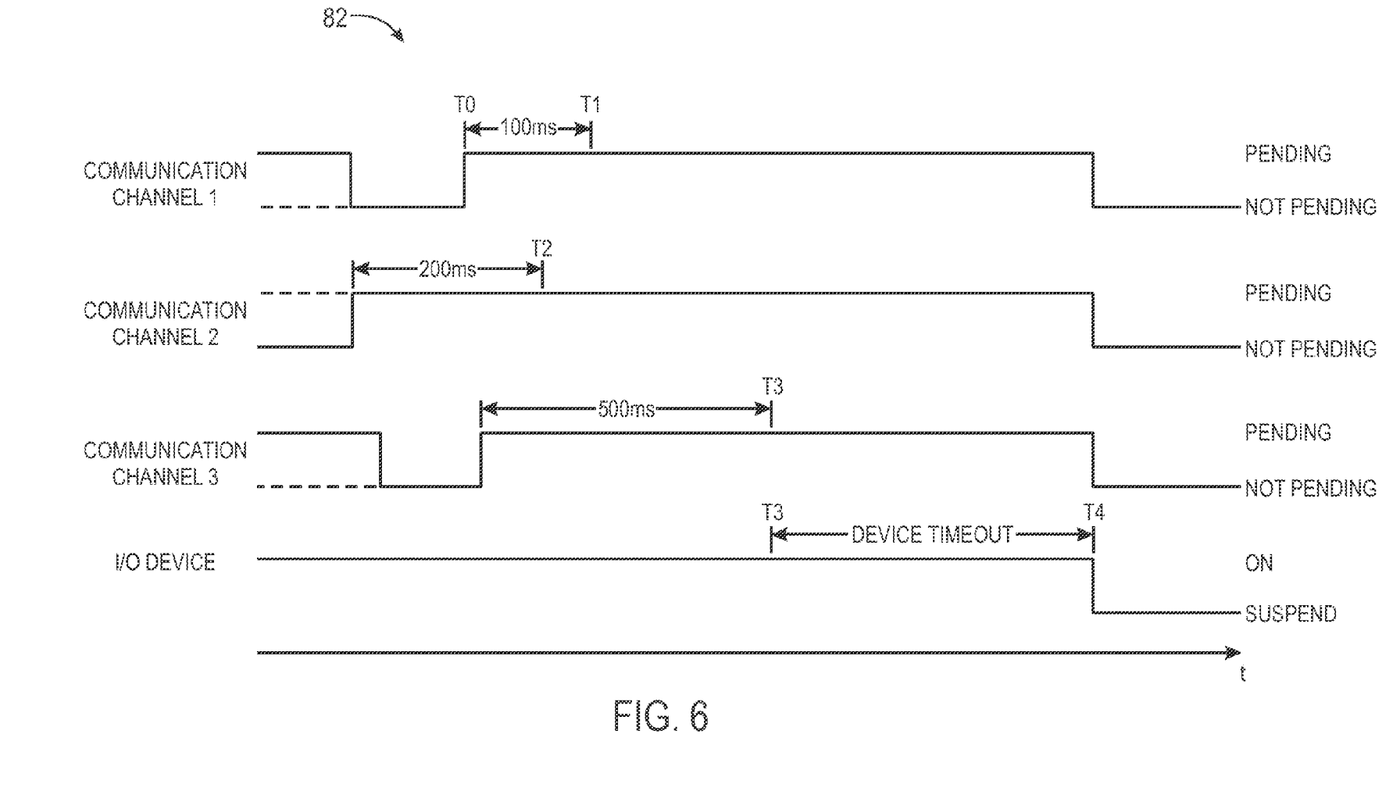
FIG. 6 is a timing diagram illustrating when a device is suspended, in accordance with an embodiment.

In either case, the processor 18 may use a flow chart depicted in FIG. 5 to perform a method for automatically suspending an idle I/O device connected to the processor 18. The connected I/O device may include any type of device that may be connected to the processor 18 of the electronic device 10. For instance, the connected I/O device may be a Universal Serial Bus (USB) device (e.g., external I/O device 28) or an High-Speed Inter-Chip (HSIC) device (e.g., internal I/O device 30). The connected I/O device may generally receive power from a power source (e.g., power source 26) of its host device (e.g., electronic device 10). As such, the connected I/O device may significantly reduce the power available to the electronic device 10 while connected to the electronic device 10 because the connected I/O device may continuously draw power from the power source 26 to stay "awake" or on. This continuous draw of power from the power source 26 may be an inefficient use of power if the connected I/O device is not in use or is not performing any action while connected to the host device. In these situations, the processor 18 may determine that the connected I/O device is idle and may suspend or place the connected I/O device into a low-power state to conserve the power being consumed by the connected I/O device. In other words, since the connected I/O device may not be performing any actions for the processor 18, the processor 18 may suspend the inactive connected I/O device to save power.

Accordingly, in one embodiment, the processor 18 may perform a method 60 to automatically suspend an idle device connected to the processor 18, thereby providing additional power savings for the electronic device 10. Referring now to FIG. 4, at block 62, the processor 18 may receive an indication that an I/O device may be connected to the processor 18.

As mentioned above, the connected I/O device may be a USB device or an HSIC device. USB devices may connect to the processor 18 via a USB bus and may include peripheral devices, such as keyboards, pointing devices, digital cameras, printers, portable media players, disk drives, network adapters, and the like. In one embodiment, the processor 18 may have access to a comprehensive set of drivers to support commonly available USB peripherals. The set of drivers may be stored in the memory 20 or the storage 22 of the electronic device and may provide information related to the operation of the corresponding USB device.

Like the USB devices, HSIC devices may also connect to the processor 18 via a USB bus. However, HSIC devices may use the USB bus as a high speed chip-to-chip interface. As such, HSIC devices may include chips or integrated circuits (e.g., baseband processor 30, internal I/O devices 32) that may be positioned close to the processor 18 (e.g., under 10 cm). This use of short range interchip connectivity may leverage the USB infrastructure to save power by using a simple two wire interface and operating at low voltage levels. In this manner, HSIC devices may be embedded within the electronic device 10 to run applications that do not involve external I/O devices. For instance, HSIC devices may be used for subsystems within the handheld device 34, such as a smartphone, to perform various functions such as communicating with various components over the Internet (e.g., baseband processor 30) and the like.

After receiving the indication that the I/O device connected to the processor 18, at block 64, the processor 18 may determine an idle policy for the connected I/O device. As such, in one embodiment, the processor 18 may access a driver (e.g., driver 56) that corresponds to the connected I/O device, and the driver may then initialize or opt into an idle policy for the connected I/O device. The idle policy may indicate an amount of time allotted for each communication channel (i.e., I/O timeout value) of the connected I/O device to complete an input/output operation, such as a read or write function. In other words, the idle policy may specify an I/O timeout value that may correspond to an amount of time that the processor 18 may allow for the connected I/O device to perform an operation (e.g., read or write) using a respective communication channel. The idle policy may set the I/O timeout value may be set to an amount of time that an input/output operation should take to complete. As such, the idle policy may assist the processor 18 in determining when a communication channel may be idle.

As mentioned above, a driver that corresponds to the connected I/O device may initialize the idle policy for the connected I/O device. In one embodiment, the driver may set the I/O timeout value for each communication channel in the I/O device. Keeping this in mind, the processor 18 may retrieve the I/O timeout value for each communication channel in the connected I/O device from the driver that corresponds to the connected I/O device.

In one embodiment, instead of indicating an I/O timeout value for a communication channel, the idle policy may indicate an I/O timeout value that may correspond to a type of I/O operation being performed in the respective communication channel. For example, a read I/O operation may have a first I/O timeout value that may be different than a second timeout value that may correspond to a write I/O operation.

In addition to an I/O timeout value for each communication channel of a connected I/O device, the idle policy may also indicate an amount of time that the processor 18 may allow for the connected I/O device to be idle (i.e., device timeout value) before suspending the I/O device and an amount of time that the processor 18 may allow for the connected I/O device to be suspended (i.e., disconnect timeout value) before disconnecting the I/O device. The connected I/O device may be considered to be idle when no I/O operations are pending on a respective communication channel or when one or more communication channels are determined to be idle.

Though the driver may set an initial idle policy with initial I/O timeout values and an initial device timeout value, in certain embodiments, the driver may dynamically alter the idle policy for the connected I/O device while the connected I/O device is in operation. For example, the driver may dynamically alter the idle policy of the connected I/O device based on periodic traffic characteristics on each communication channel, latency times for each communication channel, an amount of throughput going to the connected I/O device, and the like.

After determining the idle policy for the connected I/O device, at block 66, the processor 18 may examine each communication channel of the connected I/O device and determine whether an I/O operation is pending on any communication channel. An I/O operation may refer to any action being performed by the connected I/O device that may involve communicating with the processor 18. If the processor 18 determines that an I/O operation is not pending on a communication channel, the processor 18 may proceed to block 72 and the processor 18 may designate the connected I/O device as idle.

However, if the processor 18 determines that an I/O operation is pending on a communication channel, the processor 18 may proceed to block 68. At block 68, the processor 18 may determine an amount of time that has passed since the pending I/O operation started and whether the amount of time that passed since the pending I/O operation started is greater than the I/O timeout value specified by the idle policy. If the amount of time since the pending I/O operation started is not greater than the corresponding I/O timeout value, the processor 18 may return to block 66 and continue to monitor each communication channel for any other pending I/O operations.

On the other hand, if the processor 18 determines that the amount of time since the pending I/O operation started is greater than the corresponding I/O timeout value, the processor 18 may proceed to block 70 and determine whether any other I/O operation is pending. In this manner, the processor 18 may determine whether any new I/O operation started since it previously checked for pending I/O operations at block 66. If the processor 18 determines that there is another I/O operation pending, the processor 18 may return to block 68. Alternatively, if the processor 18 determines that another I/O operation is not pending, the processor may proceed to block 72 and designate the connected I/O device as idle.

After the processor 18 designates the connected I/O device as idle, at block 74, the processor 18 may determine an amount of time that has passed since the I/O device has been designated as idle. If the processor 18 determines that the amount of time that passed since the I/O device has been designated as idle is not greater than the device timeout value specified by the idle policy, the processor 18 may return to block 66.

However, if the processor 18 determines that the amount of time that passed since the I/O device has been designated as idle is greater than the device timeout value specified by the idle policy, the processor 18 may proceed to block 76 and suspend the connected I/O device. By suspending the connected I/O device, the processor 18 may place the connected I/O device in a low-power state such that the connected I/O device draws a low amount of current as compared to its normal operating state, thereby consuming a minimum amount of power from the power source 26. For instance, the connected I/O device may be placed in a sleep state such that it may be performing minimal operations.

For HSIC devices, after suspending the device, the processor 18 may disconnect the connected HSIC device after an additional amount of time has passed since the device may have been suspended. In one embodiment, the driver that corresponds to the connected HSIC device may specify a disconnect timeout time, which may indicate an amount of time that should expire after the connected I/O device has been suspended before the processor 18 may disconnect the HSIC device. As such, at block 78, the processor 18 may determine an amount of time that has expired since the HSIC device has been suspended. If the processor 18 determines that the HSIC device has not been suspended for longer than the disconnect time, the processor 18 may return to block 76 and keep the HSIC device suspended. However, if the processor 18 determines that the HSIC device has been suspended for an amount of time that is greater than the disconnect time, the processor 18 may proceed to block 80 and disconnect the HSIC device from the processor 18. In this way, the HSIC device consumes no power from the power source 26 because it is disconnected from the electronic device 10 altogether.

HSIC devices may be disconnected because the processor 18 may still be able to re-establish a connection with the disconnected HSIC devices after the HSIC devices are no longer idle. Conversely, the processor 18 may not disconnect USB devices that may be connected to the processor 18 because there may not be a way to re-establish a connection with the USB devices after the USB devices are no longer idle.

After the connected I/O device is no longer idle, the processor 18 may issue a resume command to the connected I/O device to enable the connected I/O device to exit its suspended state. For instance, if the processor 18 receives a packet to send to the connected I/O device or instructions to use the connected I/O device, the processor 18 may issues the resume command to the connected I/O device, which may enable the connected I/O device to exit its low-power state and operate normally. Alternatively, the connected I/O device may remotely issue a wakeup command to itself when it receives some input indicating that it is no longer idle.

Keeping the method 60 described above in mind, FIG. 6 depicts a timing diagram 82 that illustrates when I/O operations may be considered to be idle and when a connected I/O device may be suspended in accordance with an embodiment. The timing diagram 82 includes three communication channels such as three packet data protocols (PDPs). The idle policies of the three communication channels may specify I/O timeout values of 100 ms, 200 ms, and 500 ms, respectively. At time T0, an I/O operation on communication channel 1 may begin. At time T1, which is 100 ms after the I/O operation on communication channel 1 began, the processor 18 may designate communication channel 1 as idle since the I/O operation has not finished (i.e., pending) before the expiration of the corresponding I/O timeout value (block 66). Similarly, at times T2 and T3, the processor 18 may designate communication channel 2 and communication channel 3 as idle, respectively. At time T3, since no other I/O operations are pending on any of the communication channels (block 70), the processor 18 may begin a timer to determine whether the I/O device should be suspended. Since the I/O operations on each communication channel remain pending for a duration that exceeds the device timeout value, at time T4, the processor 18 may suspend the connected I/O device (block 76).

Figure 7:
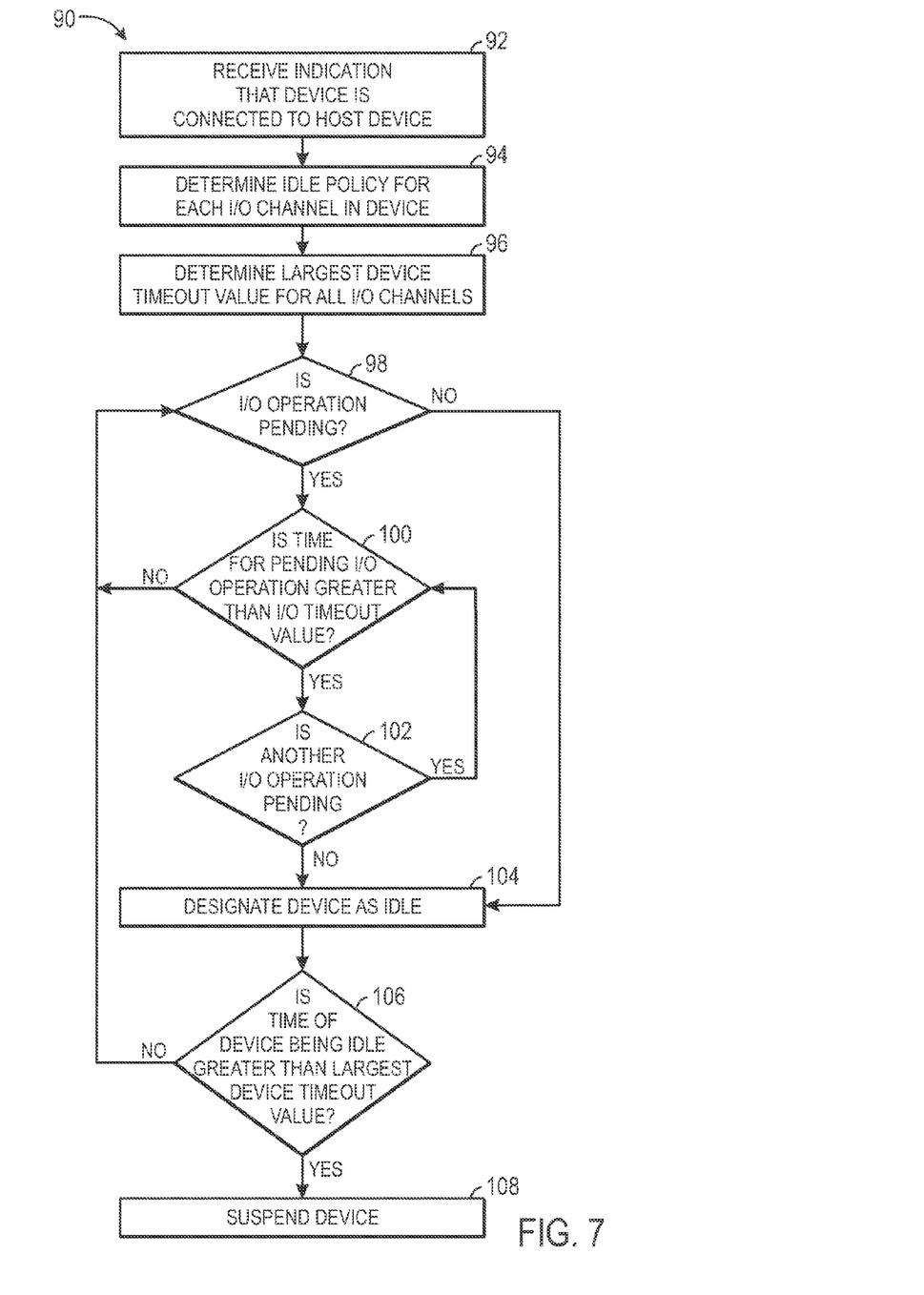
FIG. 7 is a flow chart that depicts a method for suspending an idle device that is associated with multiple drivers, in accordance with an embodiment.
Figure 8:
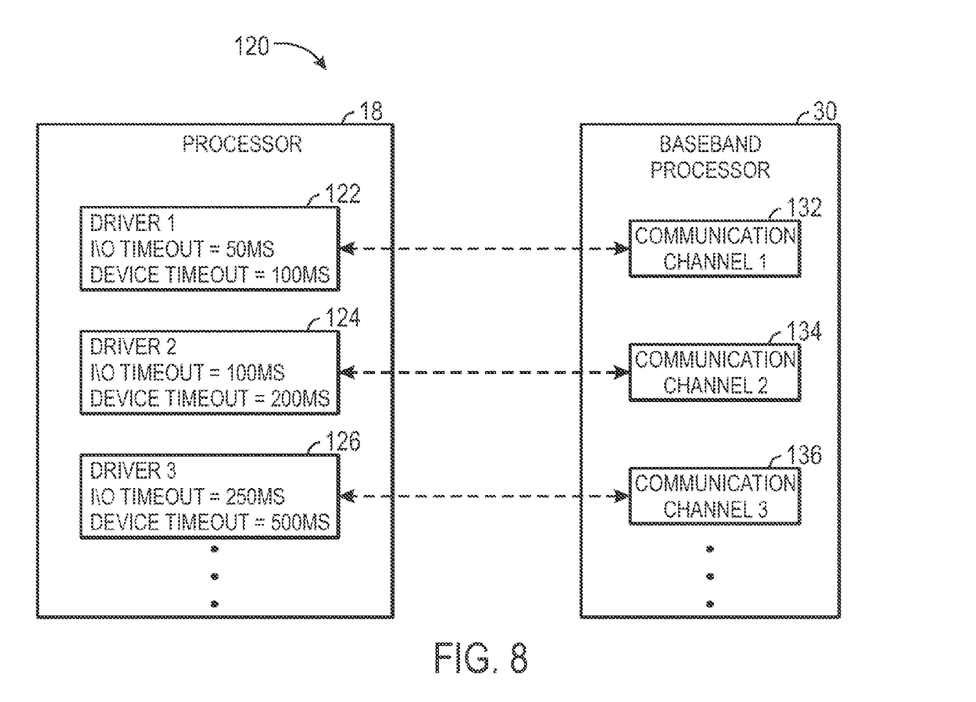
FIG. 8 is a block diagram of communication channels between a baseband processor and a processor in the electronic device of FIG. 1, in accordance with an embodiment.

Keeping the foregoing in mind, in one embodiment, a connected I/O device may include multiple communication channels such that each communication channel may have an individual driver associated therewith. In this case, each individual driver may specify an I/O timeout for its respective communication channel and a device timeout value for the connected I/O device. As such, the processor 18 may receive multiple device timeout values for a single connected I/O device. FIG. 7 depicts a method 90 for suspending an idle I/O device that is associated with multiple drivers. To provide a more clear description of the method 90, FIG. 8 illustrates a block diagram 120 depicting an example of an I/O device (baseband processor 30) that may have multiple communication channels (132, 134, 136) that may be associated with multiple drivers (122, 124, 126), respectively.

At block 92, the processor 18 may receive an indication that an I/O device may be connected to the processor 18 (i.e., electronic device 10). For instance, referring to FIG. 8, the processor 18 may receive an indication that the baseband processor 30 has connected to the processor 18.

At block 94, the processor 18 may determine an idle policy for each communication channel in the connected I/O device. In one embodiment, the processor 18 may retrieve an idle policy from a respective driver that corresponds to each respective communication channel in the connected I/O device. Each respective driver may then initialize or opt into a respective idle policy for each respective communication channel (e.g., 132, 134, and 136) in the connected I/O device. Each respective idle policy may indicate an I/O timeout value for respective communication channel. Additionally, each respective idle policy may indicate a respective device timeout value for the connected I/O device. Referring to FIG. 8, the drivers 122, 124, and 126 may retrieve respective I/O timeout values and respective device timeout values for the respective communication channels (132, 134, and 136). For instance, the drivers 122, 124, and 126 may initialize idle policies for the communication channels 132, 134, and 136 that may include I/O timeouts of 50 ms, 100 ms, and 250 ms, and device timeouts of 100 ms, 200 ms, and 500 ms, respectively.

At block 96, the processor 18 may identify the largest device timeout value for each respective communication channel. The processor 18 may then use the largest device timeout value to determine whether to suspend the I/O device, as will be explained below.

The processor 18 may then perform blocks 98-104, which may correspond to blocks 66-72, described above with reference to FIG. 5. At block 106, the processor 18 may determine an amount of time that has passed since the I/O device has been designated as idle. If the processor 18 determines that the amount of time that passed since the I/O device has been designated as idle is not greater than the largest device timeout value determined at block 96, the processor 18 may return to block 98.

However, if the processor 18 determines that the amount of time that passed since the I/O device has been designated as idle is greater than the largest device timeout value determined at block 96, the processor 18 may proceed to block 108 and suspend the connected I/O device.

If the connected I/O device is an HSIC device, like the baseband processor 30 depicted in FIG. 8, after suspending the I/O device, the processor 18 may disconnect the connected HSIC device after an additional amount of time has passed since the device may have been suspended. In one embodiment, the drivers that correspond to the connected HSIC device may specify disconnect timeout times similar to device timeout values. The processor 18 may apply the largest disconnect timeout value when determining whether to disconnect the HSIC device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
   receiving, by a processor, an indication that a device having a communication channel is connected to a host device;
   determining, by the processor, a first timeout value associated with the communication channel, wherein the first timeout value corresponds to a first amount of time allotted for an operation to be pending in the communication channel, wherein the operation is pending while the operation is being performed using the communication channel until the operation is complete;
   determining a second timeout value associated with the device, wherein the second timeout value corresponds to a second amount of time allotted for the device to be designated as idle before the device is suspended;
   designating, by the processor, the device as idle when the operation is pending in the communication channel for longer than the first amount of time and when the operation is not complete;
   determining, by the processor, whether the device is idle for longer than the second amount of time, wherein the second amount of time begins when the device is designated as idle; and
   issuing, by the processor, a command to the device when the device has been idle for the second amount of time, wherein the command is configured to suspend the device.

2. The method of claim 1, wherein determining the first timeout value and the second timeout value comprises retrieving, by the processor, the first timeout value and the second timeout value from a driver associated with the device.

3. The method of claim 1, wherein the device is designated as idle when there is no operation pending in the communication channel.

4. The method of claim 1, wherein suspending the device comprises placing, by the processor, the device in a low-power state such that the device draws a substantially lesser amount of current than in a normal operating state.

5. The method of claim 1, comprising:
   determining a third timeout value associated with the device, wherein the third timeout value corresponds to a third amount of time allotted for the device to be suspended before the device is disconnected from the host device; and
   disconnecting the device when the device has been suspended for the third amount of time that is greater than the third timeout value.

6. The method of claim 1, comprising:
   determining, by the processor, that the device is no longer idle; and
   issuing, by the processor, a resume command to the device when the device is no longer idle, wherein the resume command is configured to enable the device to exit its suspended state.

7. A system comprising:
   an external device having one or more communication channels;
   a host device coupled to the external device, wherein the host device comprises a processor configured to perform one or more operations using the external device via the one or more communication channels by:
     receiving an indication that the external device is connected to the host device;
     determining one or more first timeout values associated with the one or more communication channels, respectively, wherein each of the first timeout values corresponds to a first amount of time allotted for each respective operation to be pending in each respective communication channel, wherein each respective operation is pending while the respective operation is being performed using a respective communication channel until the respective operation is complete;
     determining a second timeout value associated with the external device, wherein the second timeout value corresponds to a second amount of time allotted for the external device to be designated as idle before the external device is suspended;
   determining whether any of the operations using the communication channels are pending;
     if at least one of the operations is pending, designating the external device as idle when the at least one of the operations is pending in its respective communication channel for longer than the first amount of time and when the operation is not complete; and
     suspending the external device when the external device has been idle for longer than the second amount of time, wherein the second amount of time begins when the external device is designated as idle.

8. The system of claim 7, wherein the external device comprises a Universal Serial Bus (USB) device.

9. The system of claim 7, wherein the one or more operations comprise one or more read operations, one or more write operations, or any combination thereof.

10. The system of claim 7, wherein the processor is configured to determine the one or more first timeout values by retrieving the one or more first timeout values from one or more drivers associated with the one or more communication channels.

11. The system of claim 10, wherein the one or more drivers determines the one or more first timeout values based at least in part on a type of operation being performed in the respective communication channel.

12. The system of claim 7, wherein the processor is configured to determine that the external device is idle when there are no operations pending on the one or more communication channels.

13. The system of claim 7, wherein the processor is configured to determine that the external device is idle when:

the at least one of the operations is pending in its respective communication channel for longer than the respective first amount of time; and one or more remaining communication channels have no operations pending.

14. The system of claim 7, wherein suspending the external device comprises placing the external device in a low-power state such that the external device draws a substantially lesser amount of current than in a normal operating state.

15. The system of claim 7, wherein the external device is a High-Speed Inter-Chip (HSIC) device.

16. The system of claim 15, wherein the processor is configured to manage the external device by:

determining a third timeout value associated with the HSIC device, wherein the third timeout value corresponds to third amount of time allotted for the HSIC device to be suspended before the device is disconnected from the host device; and disconnecting the HSIC device when the HSIC device has been suspended for longer than the third amount of time.

17. The system of claim 16, wherein the processor is configured to manage the external device by:

determining that the HSIC device is no longer idle; and issuing a resume command to the HSIC device when the HSIC device is no longer idle, wherein the resume command is configured to reconnect the HSIC device to the host device.

18. An electronic device comprising:

a processor configured to manage power being consumed by an external device coupled to the electronic device by:

receiving an indication that the external device having a plurality of communication channels is connected to the electronic device;

retrieving a plurality of first timeout values from a plurality of drivers associated with the plurality of communication channels, wherein each first timeout value of the plurality of first timeout values corresponds to a first amount of time allotted for a respective operation to be pending in a respective communication channel, wherein the respective operation is pending while the respective operation is being performed using the respective communication channel until the respective operation is complete;

retrieving a plurality of second timeout values associated with the device from the plurality of drivers, wherein each second timeout value of the plurality of second timeout values corresponds to a second amount of time allotted for the external device to be designated as idle before the device is suspended;

determining that the external device is idle when the respective operation is pending in the respective communication channel for longer than the respective first amount of time and when the operation is not complete;

determining a maximum second timeout value in the plurality of second timeout values; and suspending the external device when the external device has been idle for a third amount of time that is greater than the maximum second timeout value, wherein the third amount of time begins when the external device is designated as idle.

19. The electronic device of claim 18, wherein the plurality of drivers dynamically determines the plurality of first timeout values based at least in part on periodic traffic characteristics of each of the plurality of communication channels, a plurality of latency times that corresponds to the plurality of communication channels, or any combination thereof.

20. The electronic device of claim 18, wherein the plurality of drivers dynamically determines the plurality of second timeout values based at least in part on an amount of throughput going to the external device.

* * * * *